US012573258B2

(12) United States Patent
Ono et al.

(10) Patent No.: US 12,573,258 B2
(45) Date of Patent: Mar. 10, 2026

(54) PATTERN VARIABLY DISPLAYING DEVICE, GAME MACHINE, AND PATTERN VARIABLY DISPLAYING METHOD

(71) Applicant: OMRON Corporation, Kyoto (JP)

(72) Inventors: Takahiro Ono, Kyoto (JP); Masaaki Sumi, Kyoto (JP); Takuya Kudo, Kyoto (JP); Takehiro Agata, Kyoto (JP); Tatsuya Adachi, Kyoto (JP); Shun Kato, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 231 days.

(21) Appl. No.: 18/461,490

(22) Filed: Sep. 5, 2023

(65) Prior Publication Data

US 2024/0119783 A1 Apr. 11, 2024

(30) Foreign Application Priority Data

Oct. 11, 2022 (JP) ................................ 2022-163377

(51) Int. Cl.
*G07F 17/32* (2006.01)

(52) U.S. Cl.
CPC ...... *G07F 17/3213* (2013.01); *G07F 17/3216* (2013.01); *G07F 17/3223* (2013.01)

(58) Field of Classification Search
CPC ............. G07F 17/3213; G07F 17/3216; G07F 17/3223
See application file for complete search history.

(56) References Cited

U.S. PATENT DOCUMENTS

| | | | | |
|---|---|---|---|---|
| 5,839,957 A * | 11/1998 | Schneider | G07F 17/34 | 463/20 |
| 2006/0068900 A1* | 3/2006 | Englman | G07F 17/3202 | 463/25 |
| 2010/0285861 A1* | 11/2010 | Gowin | G07F 17/3211 | 463/20 |
| 2022/0277612 A1* | 9/2022 | Shaffer, Jr. | G07F 17/3213 | |

FOREIGN PATENT DOCUMENTS

| | | |
|---|---|---|
| JP | 2019217032 | 12/2019 |
| JP | 2019217401 | 12/2019 |
| JP | 2022057551 | 4/2022 |

* cited by examiner

*Primary Examiner* — Werner G Garner
(74) *Attorney, Agent, or Firm* — JCIPRNET

(57) ABSTRACT

A pattern variably displaying device includes: sphere reels, in which patterns are described on a surface of a sphere; a sphere driving device, driving each of the sphere reels; and a reel control part, controlling the sphere driving device.

10 Claims, 18 Drawing Sheets

| | ax | ay | az |
|---|---|---|---|
|  | 0 | 0 | −1 |
|  | 0 | 1 | 0 |
|  | 0 | 0 | 1 |
|  | 0 | −1 | 0 |

| | ax | ay | az |
|---|---|---|---|
|  | 0 | 0 | 1 |
|  | 0 | 1 | 0 |
|  | 0 | 0 | −1 |
|  | 0 | −1 | 0 |

| | ax | ay | az |
|---|---|---|---|
|  | 1 | 0 | 0 |
|  | 0 | 1 | 0 |
|  | −1 | 0 | 0 |
|  | 0 | −1 | 0 |

| | ax | ay | az |
|---|---|---|---|
|  | −1 | 0 | 0 |
|  | 0 | 1 | 0 |
|  | 1 | 0 | 0 |
|  | 0 | −1 | 0 |

PATTERN VARIABLY DISPLAYING DEVICE, GAME MACHINE, AND PATTERN VARIABLY DISPLAYING METHOD

CROSS-REFERENCE TO RELATED APPLICATIONS

This application claims the priority benefit of Japan Application No. 2022-163377, filed on Oct. 11, 2022. The entirety of the above-mentioned patent application is hereby incorporated by reference herein and made a part of this specification.

BACKGROUND

Technical Field

The disclosure relates to a game machine.

Related Art

A slot machine, which is one of game machines, generally includes a pattern variably displaying device having a plurality of (usually three) reels on whose outer periphery a plurality of types of patterns as identification information are drawn. With a specified number of bets set, a start operation is performed to thereby start rotation of the plurality of reels. When a stop switch is operated and the rotation of each reel is stopped, a predetermined combination of patterns is derived on a winning line, and winning occurs (for example, see Japanese Patent Laid-open No. 2022-057551, Japanese Patent Laid-open No. 2019-217401, and Japanese Patent Laid-open No. 2019-217032).

In the pattern variably displaying device of a conventional game machine, a cylindrical reel is used having a plurality of patterns provided on a circumference portion. However, in a presentation in which the patterns are varied by mechanically rotating the cylindrical reel, since the reel is rotated in a constant direction, the presentation becomes monotonous. Hence, a problem arises that players show little interest.

SUMMARY

A pattern variably displaying device according to one aspect of the disclosure includes: a plurality of sphere reels, in which a plurality of patterns are described on a surface of a sphere; a sphere driving device, rotating each of the sphere reels; and a control part, controlling the sphere driving device.

A game machine according to one aspect of the disclosure includes: a pattern variably displaying device, variably displaying a plurality of patterns; and a game machine control part, determining display content of the pattern variably displaying device. The pattern variably displaying device includes: a plurality of sphere reels, in which a plurality of patterns are described on a surface of a sphere; a sphere driving device, driving each of the sphere reels; and a control part, controlling the sphere driving device.

A pattern variably displaying method according to one aspect of the disclosure includes the following steps. A stop pattern of a plurality of sphere reels having a plurality of patterns described on a surface of a sphere is acquired, the stop pattern being the pattern at the time when the sphere reels stop rotating. A rotation direction of the sphere reels is determined from a history of a posture of the sphere reels. A sphere driving device that rotates the sphere reels is driven so that the rotation direction corresponds to the stop pattern. The sphere driving device is driven to stop rotation of the sphere reels at the stop pattern.

DESCRIPTION OF THE EMBODIMENTS

Figure 1:
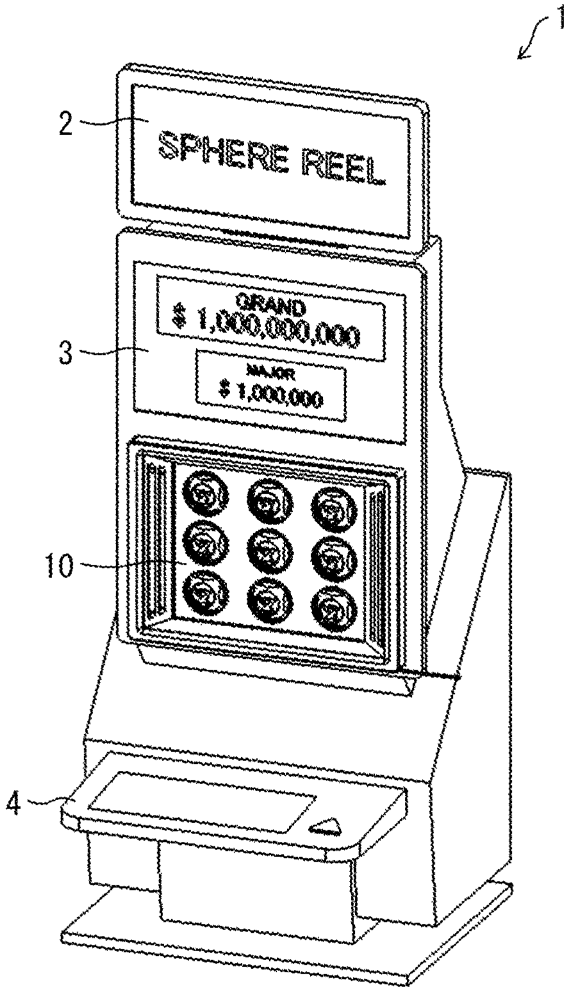
FIG. 1 is an external view illustrating one example of a game machine according to the present embodiment.

One aspect of the disclosure realizes a pattern variably displaying device, a game machine, and a pattern variably displaying method that make it possible to arouse a player's interest.

A pattern variably displaying device according to one aspect of the disclosure includes: a plurality of sphere reels, in which a plurality of patterns are described on a surface of a sphere; a sphere driving device, rotating each of the sphere reels; and a control part, controlling the sphere driving device.

According to the above configuration, the sphere reel can be rotated in a complex manner by the sphere driving device. Hence, a pattern variably displaying device that attracts a player can be realized.

The sphere reels may each include: a detection part, detecting a posture of the sphere reel; an output part, outputting the posture to the control part; and a power supply, supplying power to the detection part and the output part.

According to the above configuration, the pattern variably displaying device is able to detect the posture of the sphere reel. Hence, the sphere reel can be controlled to any posture, and the player can be attracted.

The control part may acquire a stop pattern which is the pattern at the time when the sphere reel stops rotating, may determine a rotation direction of the sphere reel from a history of the posture, may drive the sphere driving device so that the rotation direction corresponds to the stop pattern, and may drive the sphere driving device to stop rotation of the sphere reel at the stop pattern.

According to the above configuration, the sphere reel can be stopped at a position where the stop pattern can be visually recognized.

The pattern variably displaying device may include a power transmitter using a coil, and the power supply may be a power receiver using a coil.

According to the above configuration, since the sphere reel includes therein a coil for non-contact power supply, and the sphere reel is supplied with power from the pattern variably displaying device in a non-contact manner, infinite rotation of the sphere reel is possible. Hence, rotation of the sphere reel is not restricted, and the player can be attracted.

The output part may use communication in a wireless tag.

According to the above configuration, the power supply and the output part can be integrally configured, and the cost of the pattern variably displaying device can be reduced.

The power supply may be a battery.

The sphere driving device may include: a first drive, bringing a first roller into contact with the sphere reel and rotating the sphere reel about a first axis; and a second drive, bringing a second roller into contact with the sphere reel and rotating the sphere reel about a second axis different from the first axis.

According to the above configuration, since the sphere reel is rotated by a mechanism that rotates about two different rotation axes, the sphere reel is able to take any posture with two degrees of freedom.

The first roller may have a constant radius along a circumferential direction. The second roller may include a large diameter portion with a large roller diameter and a small diameter portion with a small roller diameter along the circumferential direction.

According to the above configuration, since the second roller is a roller including the large diameter portion with a large roller diameter and the small diameter portion with a small roller diameter, the second roller may be in contact or out of contact with the sphere reel. Hence, even if the second roller has large friction, by bringing the second roller out of contact with the sphere reel, the second drive does not hinder the rotation of the sphere reel driven by the first drive only.

The second drive may include a retreat portion that prevents the second roller from contacting the sphere reel.

According to the above configuration, since the second drive includes the retreat portion, the second roller may be in contact or out of contact with the sphere reel. Hence, even if the second roller has large friction, by bringing the second roller out of contact with the sphere reel, the second drive does not hinder the rotation of the sphere reel driven by the first drive only.

The second drive may further include a separation detection part that detects that the second roller is not in contact with the sphere reel.

According to the above configuration, whether the second roller is in contact with the sphere reel can be detected by the separation detection part.

A game machine according to one aspect of the disclosure includes: a pattern variably displaying device, variably displaying a plurality of patterns; and a game machine control part, determining display content of the pattern variably displaying device. The pattern variably displaying device includes: a plurality of sphere reels, in which a plurality of patterns are described on a surface of a sphere; a sphere driving device, driving each of the sphere reels; and a control part, controlling the sphere driving device.

According to the above configuration, the player can be attracted by the game machine.

A pattern variably displaying method according to one aspect of the disclosure includes the following steps. A stop pattern of a plurality of sphere reels having a plurality of patterns described on a surface of a sphere is acquired, the stop pattern being the pattern at the time when the sphere reels stop rotating. A rotation direction of the sphere reels is determined from a history of a posture of the sphere reels. A sphere driving device that rotates the sphere reels is driven so that the rotation direction corresponds to the stop pattern. The sphere driving device is driven to stop rotation of the sphere reels at the stop pattern.

According to the above method, the sphere reel can be stopped at a position where the stop pattern can be visually recognized.

According to one aspect of the disclosure, a game machine that attracts a player can be realized.

Embodiment 1

An embodiment (hereinafter also written as "the present embodiment") according to one aspect of the disclosure is hereinafter described based on the drawings. The same or equivalent portions in the drawings will be denoted by the same reference numerals, and description thereof will not be repeated.

§ 1. Application Example

FIG. 1 is an external view illustrating one example of a game machine 1 according to the present embodiment. The game machine 1 includes a pattern variably displaying device 10, a first display part 2, a second display part 3, and an operation part 4.

A player operates the operation part 4, bets a gaming value (such as a coin or a medal), and plays a game. The game machine 1 performs lotteries, and the pattern variably displaying device 10 displays a result of a main lottery among the lotteries. Depending on the type of the game machine 1, the result of the main lottery may be determined by the game machine 1 side, or may be varied by the operation of the operation part 4 by the player.

According to the fact that a lottery result displayed by the pattern variably displaying device 10 satisfies a predetermined condition, an additional sub-lottery may be performed. A result of the sub-lottery is displayed by, for example, the first display part 2. The second display part 3 displays the gaming value currently possessed or the like.

Figure 2:
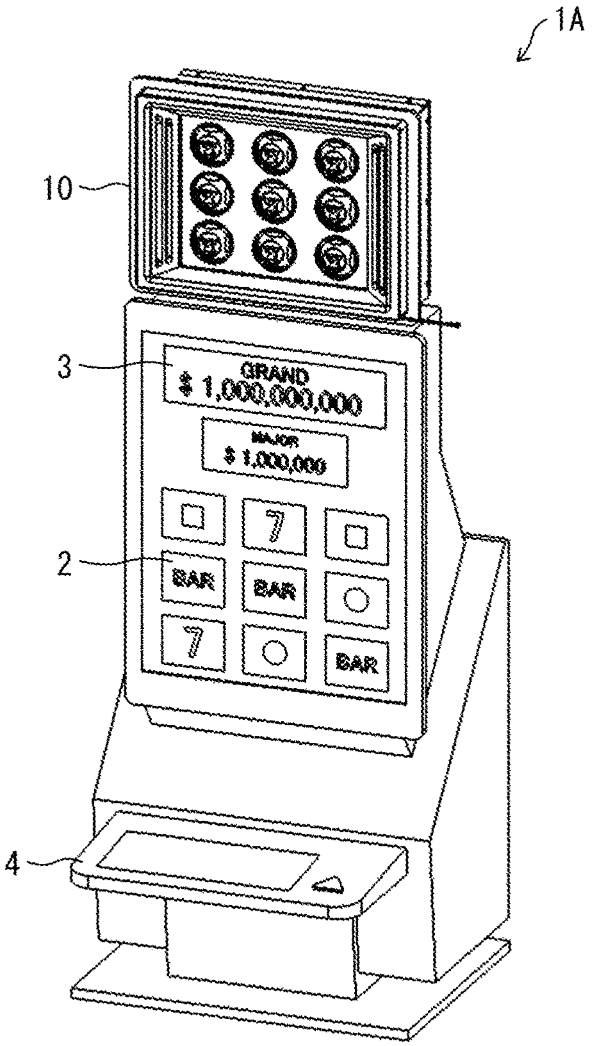
FIG. 2 is an external view illustrating another example of the game machine according to the present embodiment.

The pattern variably displaying device 10, the first display part 2 and the second display part 3 are not limited to the arrangement illustrated in FIG. 1, and may be arranged as in a game machine 1A illustrated in FIG. 2. That is, the result of the main lottery may be displayed by the first display part 2 provided in front of the player, and the result of the sub-lottery may be displayed by the pattern variably displaying device 10.

Figure 3:
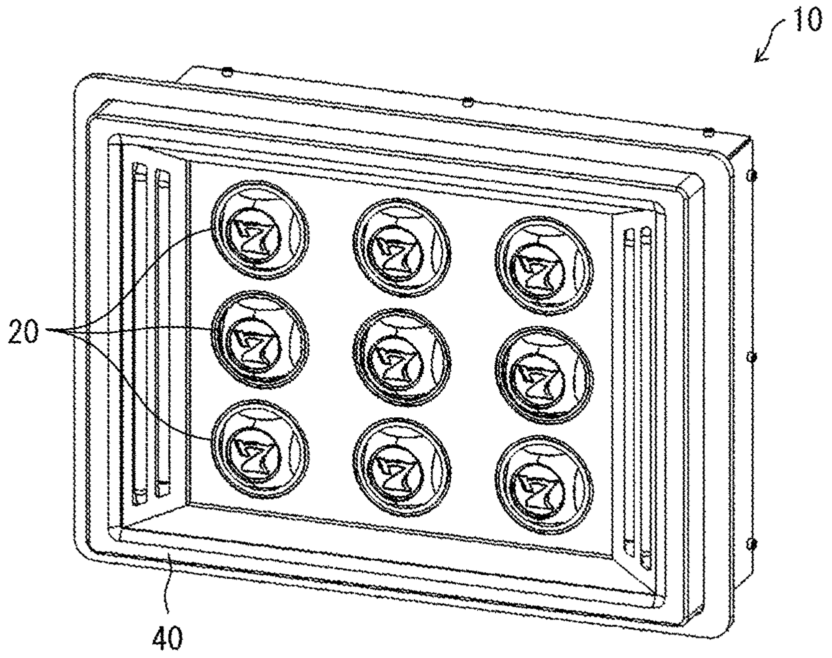
FIG. 3 is an external view of a pattern variably displaying device.

FIG. 3 is an external view of the pattern variably displaying device 10. The pattern variably displaying device 10 has a shape different from that of a cylindrical reel in a general game machine. Specifically, sphere reels 20 of a spherical shape are arranged side by side in three columns and three rows. The number of columns and the number of rows may each be any natural number without being limited to three. An outer surface of the sphere reel 20 is provided with a plurality of patterns.

The sphere reel 20 is rotated with at least two degrees of freedom by a sphere driving device 30 (see FIG. 8) including a plurality of rollers. Since the sphere reel 20 is held by a main body 40, unintended positional deviation or falling-off of the sphere reel 20 due to its rotation driven by the sphere driving device 30 does not occur.

Since the sphere driving device 30 allows the sphere reel 20 to freely rotate 360°, complex rotation can be mechanically realized and an arbitrary pattern can be presented to the player. Hence, the game machine 1 can attract the player.

§ 2. Configuration Example (Configuration of Game Machine 1)

Figure 4:
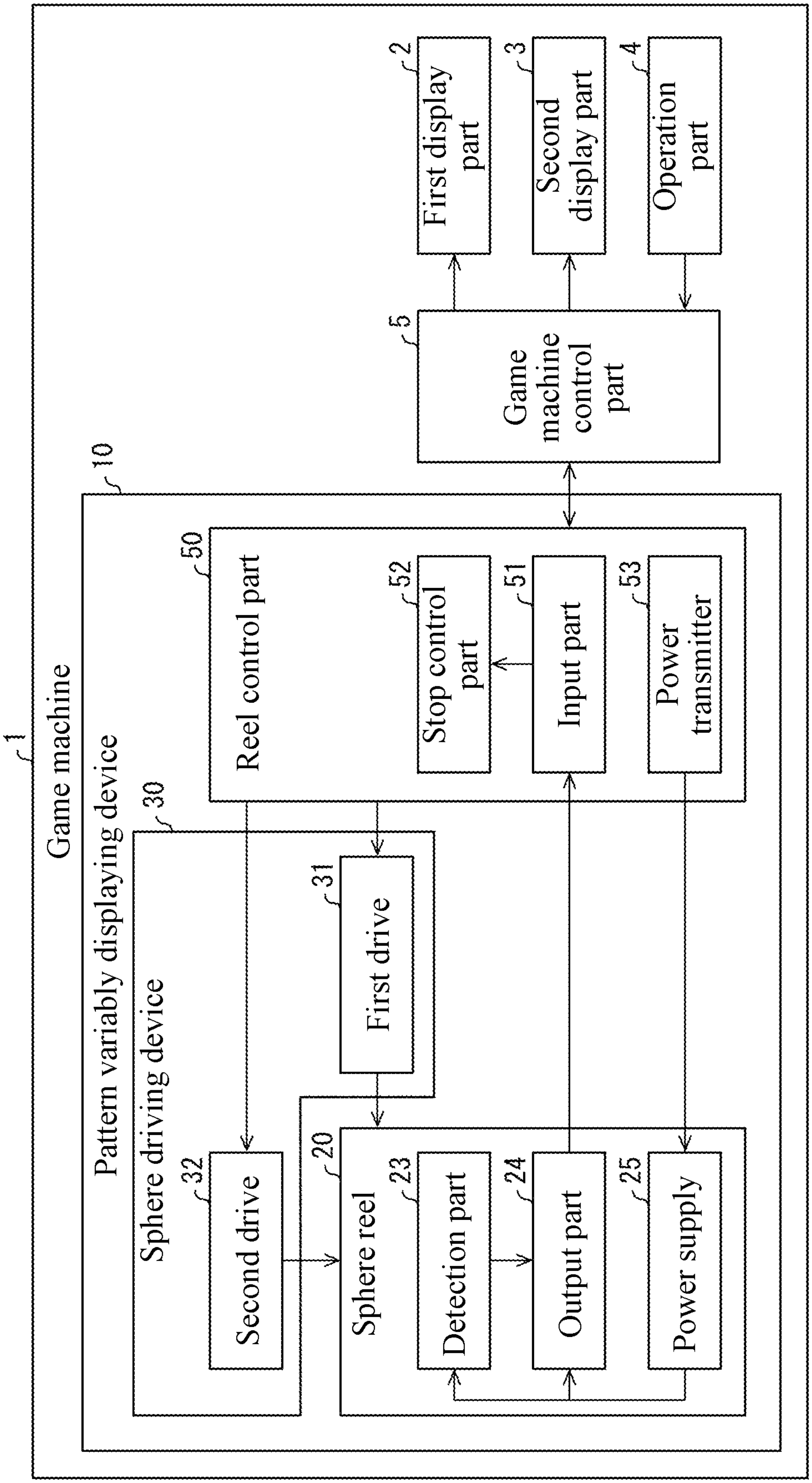
FIG. 4 is a block diagram illustrating a configuration of main parts of the game machine.

FIG. 4 is a block diagram illustrating a configuration of main parts of the game machine 1.

The first display part 2 is a display that displays the result of the main lottery or the sub-lottery. The first display part 2 is not limited to a display and may be a conventional rotating reel. The second display part 3 displays the current gaming value and the current game status.

The operation part 4 includes a bet button and a rotation start button. The operation part 4 may also include a rotation stop button.

A game machine control part 5 controls each part of the game machine 1 in an integrated manner. Specifically, the game machine control part 5 receives an input from the operation part 4, performs a lottery, and outputs a lottery result to a reel control part (control part) 50 of the pattern variably displaying device 10. In addition, the game machine control part 5 displays game-related information and other lottery results on the first display part 2 and the second display part 3.

(Configuration of Pattern Variably Displaying Device 10)

Figure 5:
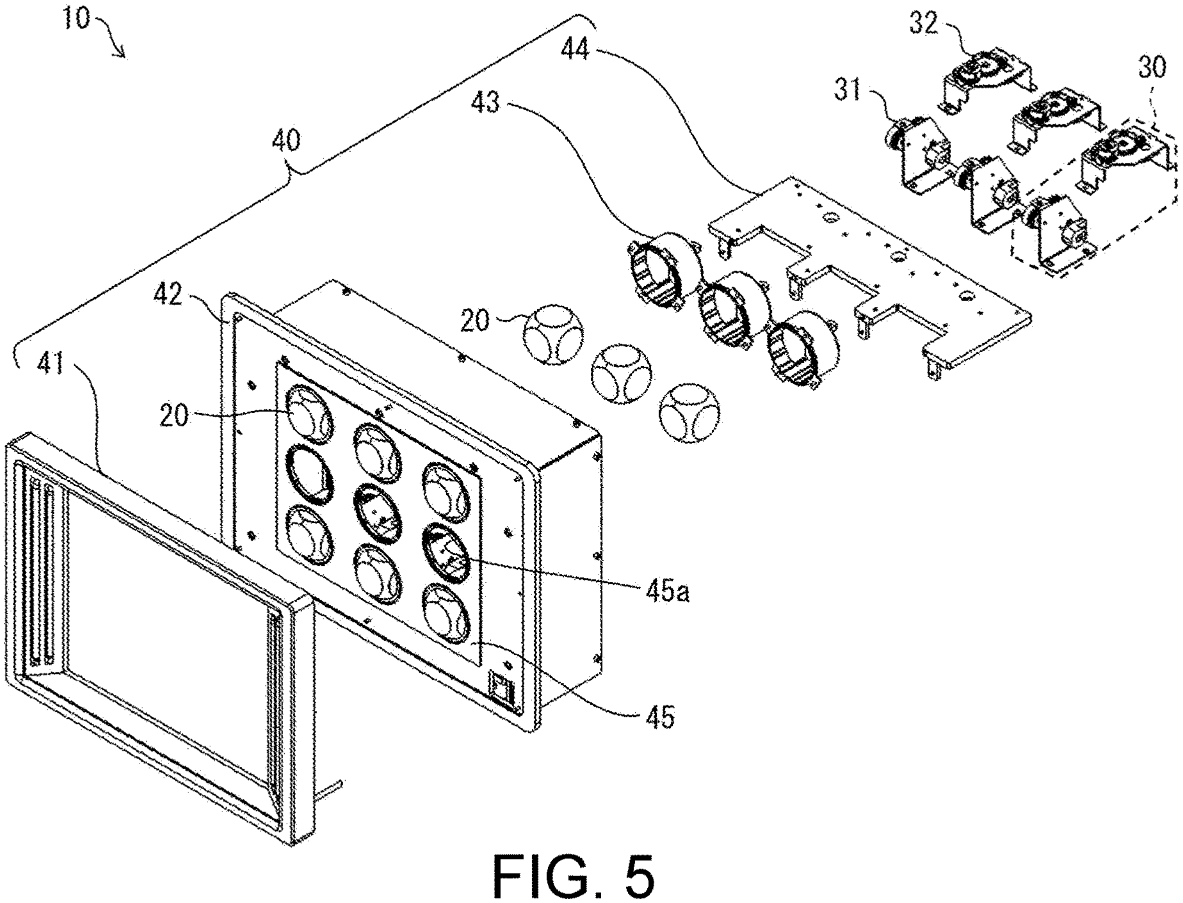
FIG. 5 is an exploded view of the pattern variably displaying device.

FIG. 5 is an exploded view of the pattern variably displaying device 10. The pattern variably displaying device 10 includes a plurality of sphere reels 20, a plurality of sphere driving devices 30, the main body 40, and the reel control part 50 (see FIG. 4).

The sphere reel 20 is a spherical reel, in which six patterns are provided in a regular hexahedron shape on an outer surface (surface) of a sphere. The patterns may not necessarily be provided in a regular hexahedron shape and may be provided in the shape of any regular polygon.

Figure 6:
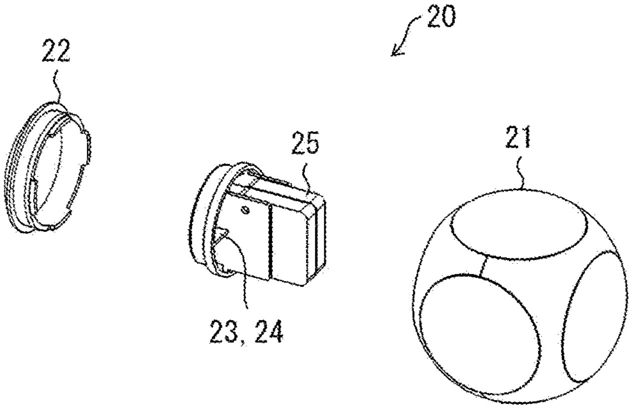
FIG. 6 is an exploded view of a sphere reel.
Figure 7:
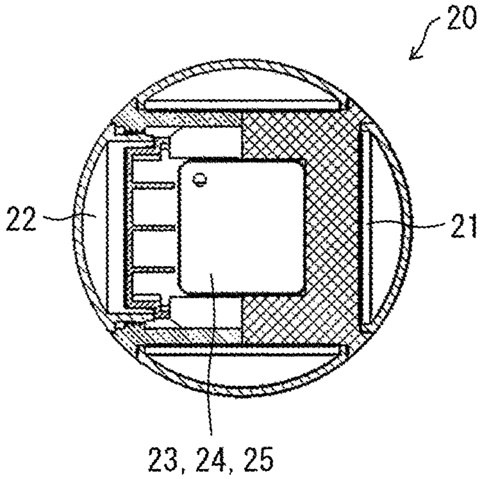
FIG. 7 is a cross-sectional view of the sphere reel.

FIG. 6 is an exploded view of the sphere reel 20. FIG. 7 is a cross-sectional view of the sphere reel 20. The sphere reel 20 includes a casing 21, a lid 22, a detection part 23, an output part 24 and a power supply 25.

The casing 21 is a spherical case provided with five out of the six patterns provided on the sphere reel 20 and having an opening in a portion thereof, and has a cavity inside.

The lid 22 is provided with the last one of the six patterns provided on the sphere reel 20 that is not provided on the casing 21, and has a shape obtained by cutting out a portion of a spherical shape.

The lid 22 and the opening of the casing 21 are threaded so as to fit together. The lid 22 may allow the detection part 23, the output part 24 and the power supply 25 to be fixed thereto. Hence, the sphere reel 20 is assembled by fixing the above members to the lid 22 and then screwing the lid 22 into the casing 21.

The detection part 23 is a sensor that detects a posture of the sphere reel 20, and is, for example, a three-axis acceleration sensor or a six-axis gyro sensor. The posture detected by the detection part 23 is output to the output part 24. In the present specification, the description is given on the assumption that the detection part 23 is a three-axis acceleration sensor.

The output part 24 outputs the posture detected by the detection part 23 to an input part 51 of the reel control part 50. The output part 24 may perform wireless communication using any communication standard.

The power supply 25 supplies power to the detection part 23 and the output part 24. The power supply 25 may be a non-contact power supply coil (power receiver) or a battery.

The power supply 25 and the output part 24 may use a wireless tag such as a radio frequency identifier (RFID) tag using a common coil. That is, the output part 24 may perform outputting by RFID communication. Furthermore, the detection part 23, the output part 24 and the power supply 25 fit into the cavity of the casing 21.

Figure 8:
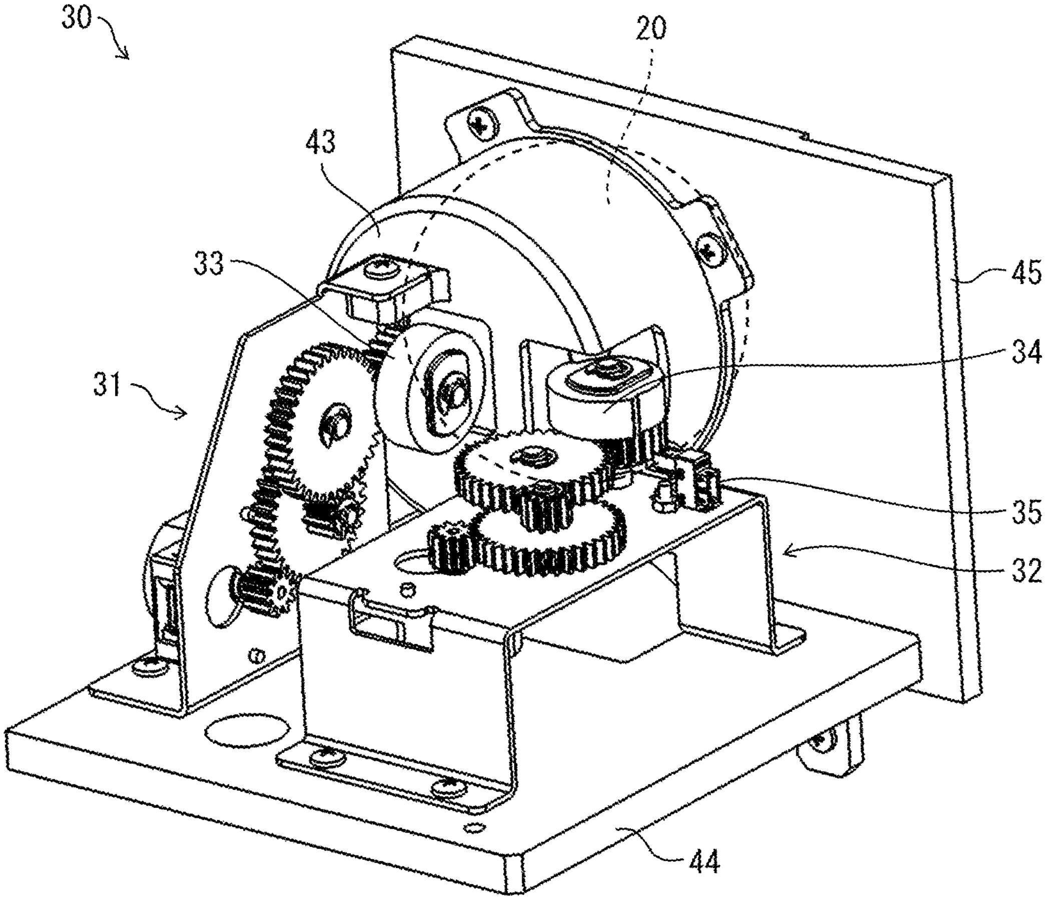
FIG. 8 is a perspective view illustrating an appearance of a sphere driving device.

FIG. 8 is a perspective view illustrating an appearance of the sphere driving device 30. The sphere driving device 30 is provided for each sphere reel 20 and drives the sphere reel 20. The sphere driving device 30 includes a first drive 31 and a second drive 32. The first drive 31 and the second drive 32 each include a motor and a plurality of gears and rollers. Both motors are bidirectional motors capable of reversible rotation. A rotation plane of a first roller of the first drive 31 is a vertical plane passing through the center of the sphere reel 20, and a rotation plane of a second roller of the second drive 32 is a horizontal plane passing through the center of the sphere reel 20.

The first drive 31 includes, as the first roller, a circular roller 33 rotating in the vertical plane. The sphere reel 20 is rotated longitudinally by the circular roller 33. The circular roller 33 has a constant radius along a circumferential direction, and has a circular cross section cut in a direction orthogonal to a rotation axis. Hence, in the circular roller 33, the whole area in the circumferential direction is a contact area in contact with the sphere reel 20, and the circular roller 33 always contacts the sphere reel 20. That is, regardless of the angle of the circular roller 33, the circular roller 33 is able to transmit power to the sphere reel 20 by friction.

The second drive 32 includes, as the second roller, a different diameter roller 34 rotating in the horizontal plane. The sphere reel 20 is rotated laterally by the different diameter roller 34. The different diameter roller 34 is a roller including a large diameter portion with a large roller diameter and a small diameter portion with a small roller diameter along the circumferential direction. That is, the different diameter roller 34 includes a portion having a short distance (radius) from the rotation axis, which is obtained by cutting out a portion of a surface in the circumferential direction, and this portion serves as a non-contact area not in contact with the sphere reel 20. Hence, the different diameter roller 34 intermittently contacts the sphere reel 20.

Figure 9:
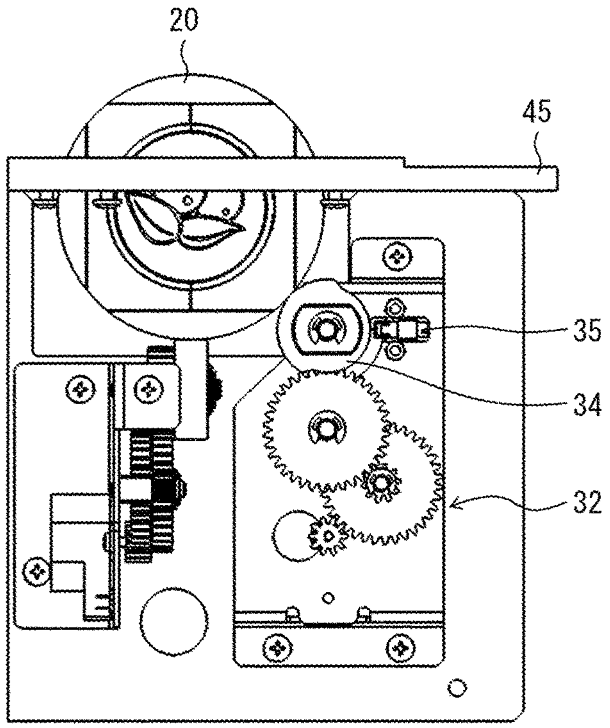
FIG. 9 illustrates a state in which a different diameter roller is in contact with the sphere reel.
Figure 10:
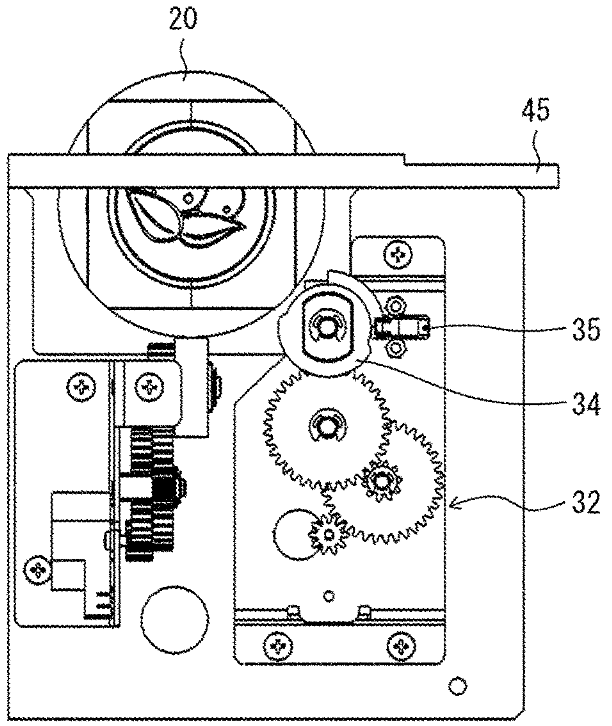
FIG. 10 illustrates a state in which the different diameter roller is separated from the sphere reel.

FIG. 9 illustrates a state in which the different diameter roller 34 is in contact with the sphere reel 20. FIG. 10 illustrates a state in which the different diameter roller 34 is not in contact with the sphere reel 20. With the different diameter roller 34 in contact with the sphere reel 20 as illustrated in FIG. 9, the different diameter roller 34 is able to transmit power to the sphere reel 20 by friction. In contrast, with the different diameter roller 34 not in contact with the sphere reel 20 as illustrated in FIG. 10, the different diameter roller 34 is unable to transmit power to the sphere reel 20 by friction.

In this way, the different diameter roller 34 includes a portion with a roller diameter that does not allow contact with the sphere reel 20, and this portion is called a retreat portion. Due to the presence of the retreat portion, the state can be achieved in which the different diameter roller 34 of the second drive 32 is not in contact with the sphere reel 20. Accordingly, the sphere reel 20 can be rotated by the first drive 31 without unnecessary friction. Abrasion of a roller surface or the surface of the sphere reel 20 due to friction can be prevented.

As illustrated in the present embodiment, the second drive 32 may include a home position sensor 35 (separation detection part). The home position sensor 35 is a sensor that reads a detection piece rotating integrally with the different diameter roller 34 and outputs a signal during reading of the detection piece. The home position sensor 35 generates one pulse each time the different diameter roller 34 rotates once. Hence, by using the home position sensor 35, the reel control part 50 is able to detect an origin position of the different diameter roller 34, and a rotation angle of the different diameter roller 34 obtained by using a variation from that point. Hence, by the home position sensor 35, it can be detected that the second roller (in this case, the different diameter roller 34) is not in contact with the sphere reel 20.

A rotation center axis of the circular roller 33 in the first drive 31 is a first axis, and a rotation center axis of the different diameter roller 34 in the second drive 32 is a second axis different from the first axis. Since the first axis and the second axis are different axes, the sphere reel 20 can be rotated with two degrees of freedom. In the first drive 31 and the second drive 32, the circular roller 33 and the different diameter roller 34 can be rotated bidirectionally.

As illustrated in FIG. 5, the main body 40 includes a cover 41, a base 42, a guide member 43, and a bracket 44.

The cover 41 includes a frame for decorating the pattern variably displaying device 10 viewed by the player, and a transparent plate covering a surface of the pattern variably displaying device 10.

The base 42 is a housing including a panel 45 to which a plurality of guide members 43 are attached from the back side. A total of nine guide members 43 each accommodating the sphere reel 20 inside are attached to the panel 45 in three columns and three rows. An opening 45*a* is provided at each position where the guide member 43 is attached to the panel 45. The pattern of the sphere reel 20 can be confirmed from the opening 45*a*. The opening 45*a* is designed to have a diameter smaller than a diameter of the sphere reel 20 so that the sphere reel 20 does not come off from the opening 45*a*.

The guide members 43 are provided one for each sphere reel 20 and are bottomed cylindrical members having a cavity in which the sphere reel 20 is accommodated. The sphere reel 20 is accommodated between the base 42 and the guide member 43. Appropriate clearance is provided between the sphere and the guide member 43 to enable smooth sliding of the sphere reel 20. The guide member 43 is provided with an opening for the circular roller 33 and the different diameter roller 34 to come into contact with the sphere reel 20. In the present embodiment, the guide member 43 individually accommodating the sphere reel 20 is provided. However, a plurality of accommodation parts rotatably accommodating a plurality of sphere reels 20 may be incorporated into one member.

The bracket 44 is a member for fixing the sphere driving device 30 to the main body 40. One bracket 44 is provided for each column of sphere reels 20, and a total of three brackets 44 are arranged.

As illustrated in FIG. 4, the reel control part 50 includes the input part 51, a stop control part 52 and a power transmitter 53, and controls the sphere driving device 30 based on information acquired from the sphere reel 20. The input part 51 acquires acceleration output by the output part 24 and uses it in controlling the sphere reel 20. The input part 51 outputs the acceleration to the stop control part 52. The stop control part 52 calculates and controls the amount of rotation of each of the circular roller 33 of the first drive 31 and the different diameter roller 34 of the second drive 32. The stop control part 52 also determines a rotation direction and determines a pattern (stop posture) when rotation stops, which will be described later. The power transmitter 53 is a coil that supplies power to the power supply 25 in a non-contact manner. The power supply 25 may be a battery; in this case, the power transmitter 53 may be omitted.

The reel control part 50 acquires a stop pattern which is the pattern at the time when the sphere reel 20 stops rotating, determines a rotation direction of the sphere reel 20 from a history of a posture, drives the sphere driving device 30 so that the rotation direction corresponds to the stop pattern, and drives the sphere driving device 30 to stop rotation of the sphere reel 20 at the stop pattern. The reel control part 50 performs such control for each of a plurality of sphere reels 20.

(Pattern of Sphere Reel 20)

Figure 11:
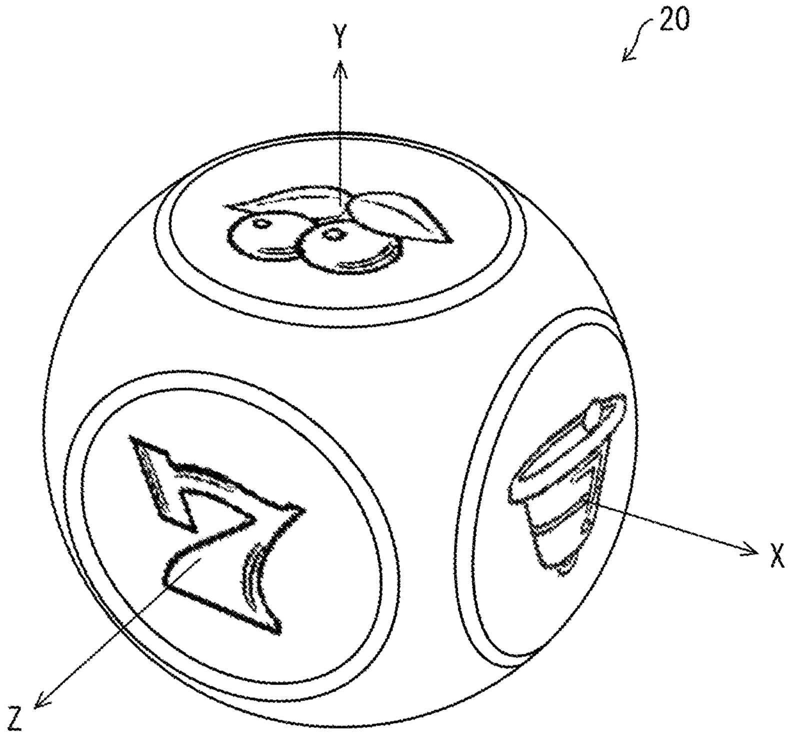
FIG. 11 is an external view of the sphere reel.
Figure 12:
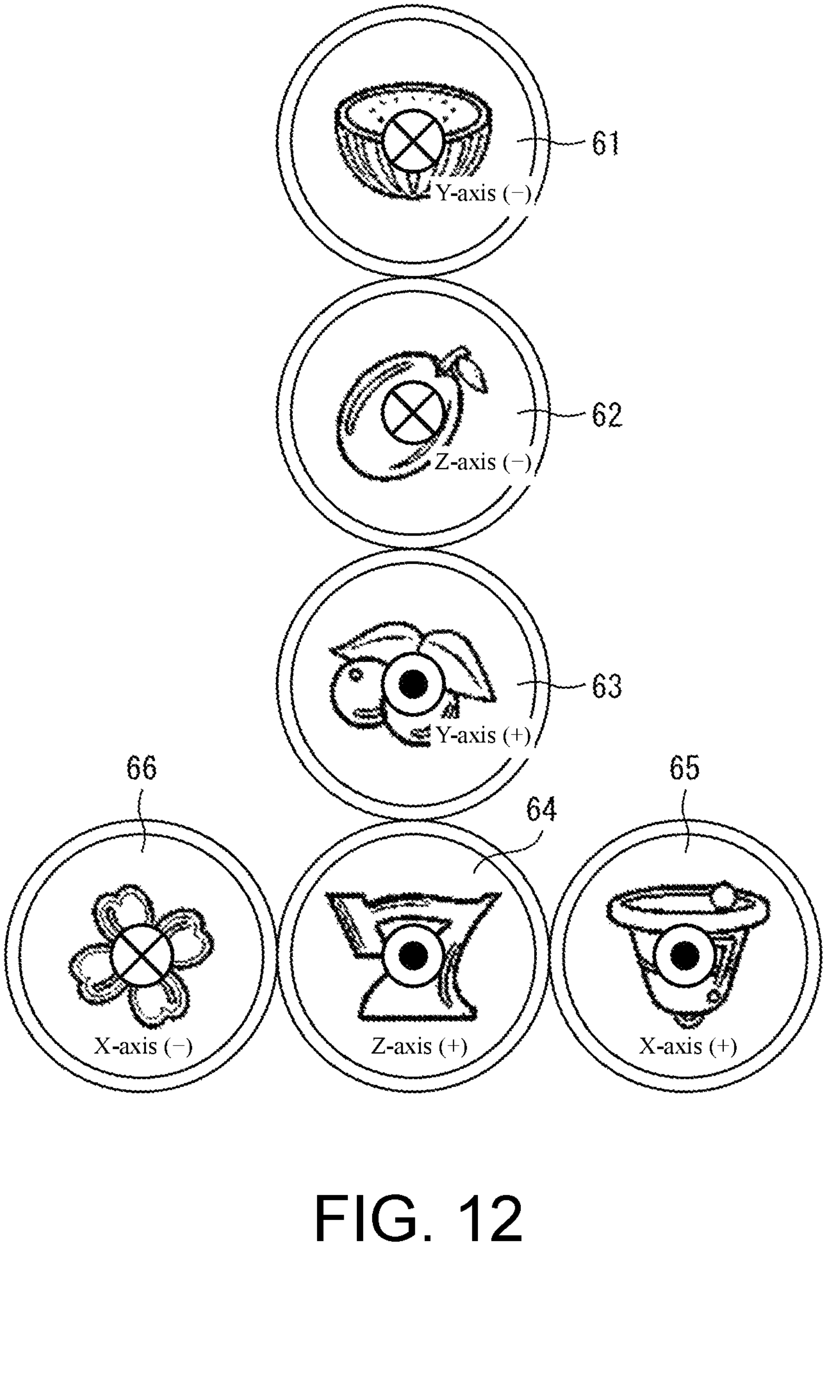
FIG. 12 is a developed view of patterns.

FIG. 11 is an external view of the sphere reel 20. FIG. 12 is a developed view of patterns in the case where the sphere reel 20 is viewed as a regular hexahedron. The patterns of the sphere reel 20 are provided in a regular hexahedron shape. Hence, the patterns of the sphere reel 20 can be developed. In the present embodiment, the patterns provided include a "watermelon" (denoted by reference numeral 61), a "plum" (denoted by reference numeral 62), a "cherry" (denoted by reference numeral 63), a number "7" (denoted by reference numeral 64), a "bell" (denoted by reference numeral 65), and a "clover" (denoted by reference numerical 66). Examples of the pattern are not limited to the above, and any pattern may be used.

In FIG. 11 and FIG. 12, also described is how to assign an axis of acceleration detected by the detection part 23 to each pattern. The axis of acceleration rotates with rotation of the sphere reel 20.

§ 3. Operation Example (Operation Example of Game Machine 1)

Figure 13:
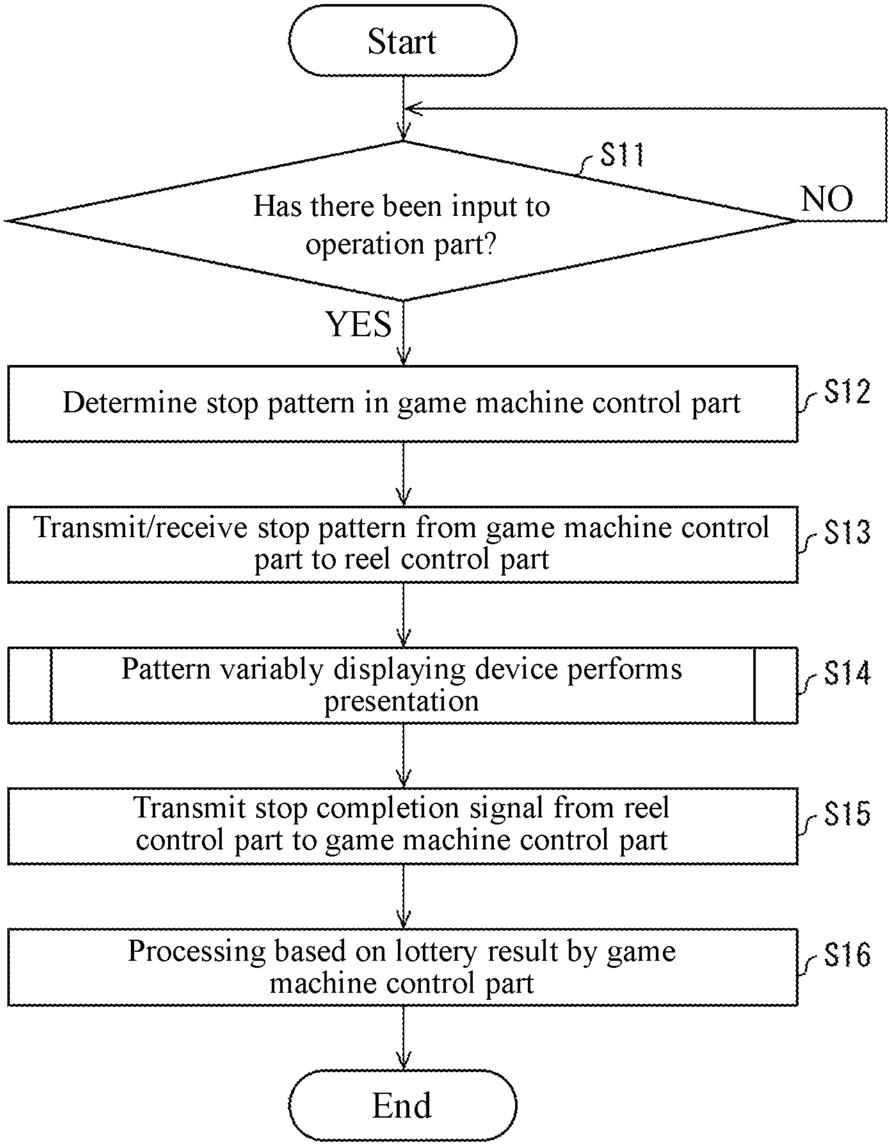
FIG. 13 is a flowchart illustrating an operation example of the game machine.

FIG. 13 is a flowchart illustrating an operation example of the game machine 1.

The operation part 4 determines whether an input by a player for starting rotation has been detected (S11). If no input for starting rotation has been made to the operation part 4, S11 is repeated.

If an input for starting rotation has been made to the operation part 4, the game machine control part 5 determines a stop pattern (S12).

The game machine control part 5 transmits the stop pattern to the reel control part 50, and the reel control part 50 receives the stop pattern (S13).

The reel control part 50 performs a presentation by the pattern variably displaying device 10 based on information on the received stop pattern (S14). Details of the presentation in the pattern variably displaying device 10 will be described later.

After rotation of the sphere reel 20 is stopped by the stop control part 52, the reel control part 50 transmits a stop completion signal to the game machine control part 5 (S15).

The game machine control part 5 updates displays in the first display part 2 and the second display part 3 with the input stop completion signal (S16). At this time, an additional lottery (sub-lottery) may be performed.

(Operation Example of Pattern Variably Displaying Device 10)

Figure 14:
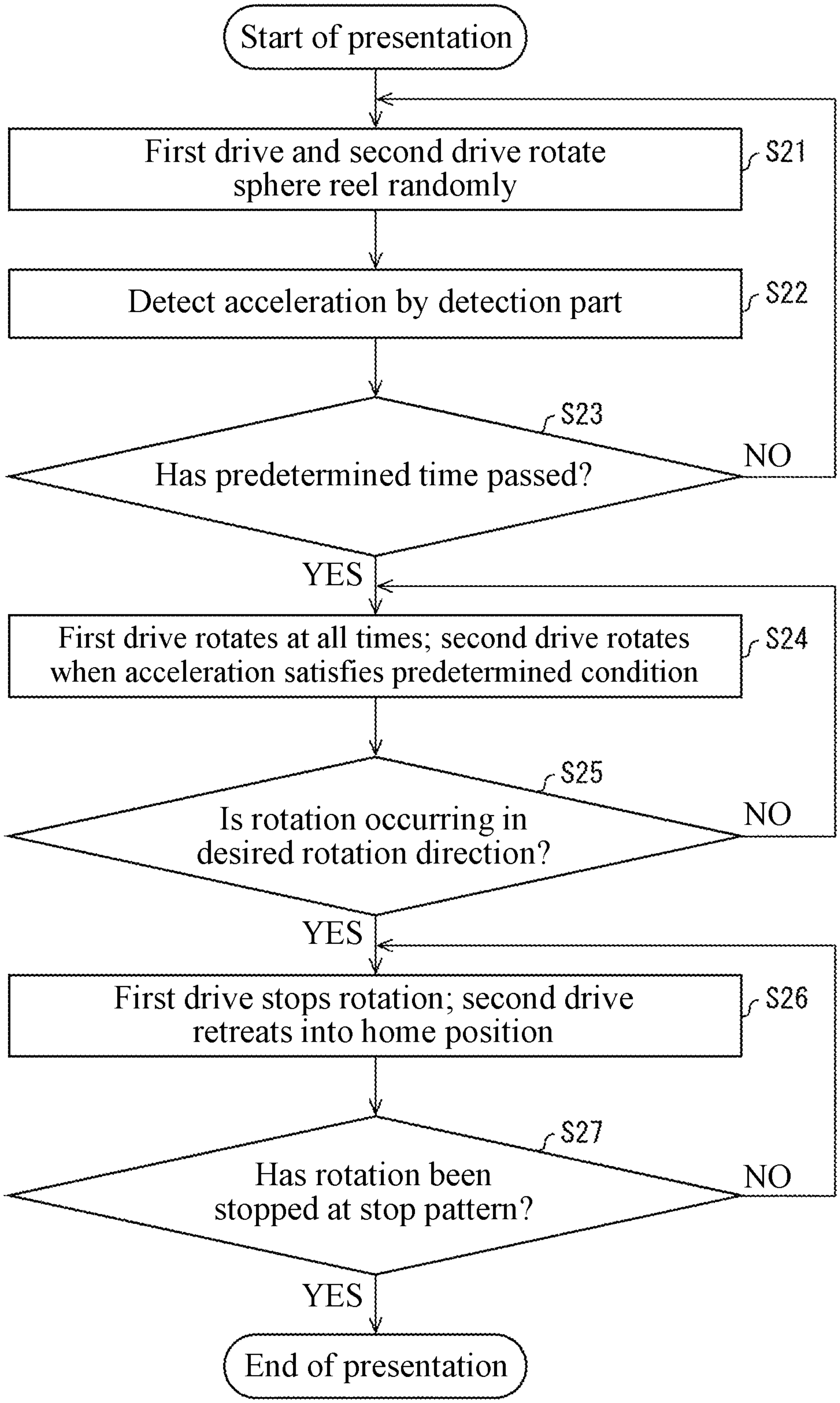
FIG. 14 is a flowchart illustrating an operation example of the pattern variably displaying device.

FIG. 14 is a flowchart illustrating an operation example of the pattern variably displaying device 10.

The reel control part 50 drives the sphere driving device 30 by an input for starting rotation. Specifically, the reel control part 50 outputs a random rotation command to the first drive 31 and the second drive 32 (S21).

The detection part 23 measures acceleration, and the output part 24 outputs the acceleration to the input part 51 (S22). This processing may always be performed regardless of whether the sphere reel 20 is rotating.

The reel control part 50 determines whether a predetermined time has passed (S23). If the predetermined time has not passed, the process returns to S21.

If the predetermined time has passed, the reel control part 50 causes the first drive 31 to rotate at all times and causes the second drive 32 to rotate when a predetermined condition is satisfied (S24). Here, the predetermined condition is that, for example, in the case where the X-axis is the rotation axis, the second drive 32 is rotated when an X-component ax of the acceleration is in the vicinity of 0 ($-\alpha<ax<\alpha$). The conditions at this time include: in the case where the Y-axis is the rotation axis, the second drive 32 is rotated when a Y-component ay is in the vicinity of 0; and in the case where the Z-axis is the rotation axis, the second drive 32 is rotated when a Z-component az is in the vicinity of 0. Here, $\alpha$ is a threshold indicating an allowable range of angular deviation, and is controlled to an absolute value within this threshold (within the allowable range).

The stop control part 52 determines whether the sphere reel 20 is rotating in a desired rotation direction from a variation in acceleration (S25). If the sphere reel 20 is not rotating in the desired rotation direction, the process returns to S24, and adjustment is made so that the sphere reel 20 rotates in the desired rotation direction.

As will be described later, the desired rotation direction here is a rotation direction in which the stop pattern can be stopped in an orientation allowing identification of the pattern, and is a rotation direction in which rotation is performed about any of the X-axis, Y-axis and Z axis as the rotation center axis. It is determined what kind of rotation direction the rotation direction is from a predetermined acceleration pattern by a method described later. The processing of S24 is repeated until the current rotation direction becomes a rotation direction suitable for the stop pattern.

By determining the rotation direction, the rotation center axis and forward/reverse rotation with respect to the rotation center axis are determined, and it is determined whether to stop in a posture in which the stop pattern is legible when the rotation stops.

If the sphere reel 20 has been rotating in the desired rotation direction, the stop control part 52 controls the rotation of the first drive 31 to stop at the input stop pattern, and controls the second drive 32 so that the different diameter roller 34 retreats into a home position where it is not in contact with the sphere reel 20 (S26).

The stop control part 52 determines whether rotation was able to be stopped at the input stop pattern (stop posture) (S27). If rotation was unable to be stopped at the input stop pattern, the process returns to S26, and adjustment is made by the first drive 31 so that rotation stops at the input stop pattern. If rotation was able to be stopped at the input stop pattern, the reel control part 50 ends the presentation. The reel control part 50 transmits the stop completion signal to the game machine control part 5.

(Determination of Orientation of Pattern)

In S21, the first drive 31 and the second drive 32 rotate randomly. Hence, the sphere reel 20 takes various postures. For example, the pattern may be rotated 180° and be displayed upside down. As a result, when rotation stops, the pattern may not be displayed in a proper orientation. Hence, the player may be confused.

Accordingly, in the processing of S24, adjustment processing is performed to allow rotation to be stopped in the orientation in which the pattern can be normally read. Specifically, variation in acceleration is monitored, the acceleration varies in a predetermined pattern, and it is determined whether the rotation direction is desired.

Figure 15:
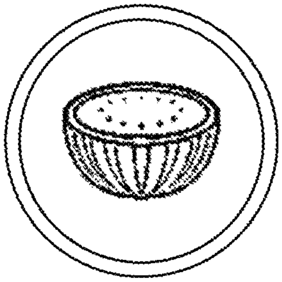
FIG. 15 is a table illustrating variation in acceleration in the case where predetermined rotation is performed in a direction in which a pattern is legible.
Figure 15:
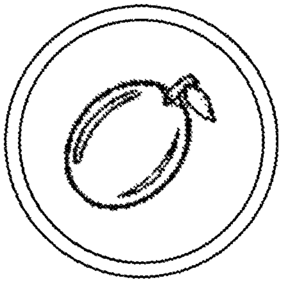
Figure 15:
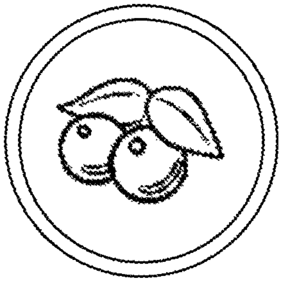
Figure 15:

FIG. 15 is a table illustrating variation in acceleration in the case where predetermined rotation is performed in a direction in which a pattern is legible. In this case, the rotation is performed in the order of "watermelon"→"plum"→"cherry"→"7"→"watermelon". At this time, a combination of accelerations (ax, ay, az) varies as follows: (0, 0, $-1G\pm\alpha$)→(0, $1G\pm\alpha$, 0)→(0, 0, $1G\pm\alpha$)→(0, $-1G\pm\alpha$, 0)→(0, 0, $-1G\pm\alpha$). Hereinafter, with respect to the representation of acceleration, the acceleration will be represented by a unit vector with a vector length of $1G\pm\alpha$. That is, in the above case, the combination of accelerations is described as (0, 0, −1)→(0, 1, 0)→(0, 0, 1)→(0, −1, 0) (0, 0, −1).

Figure 16:
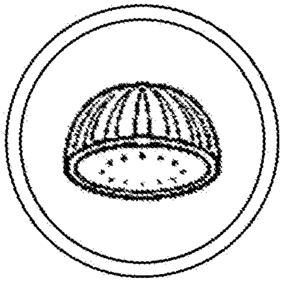
FIG. 16 is a table illustrating variation in acceleration in the case where rotation is performed in the same rotation direction as in FIG. 15 with the pattern turned upside down.
Figure 16:
Figure 16:
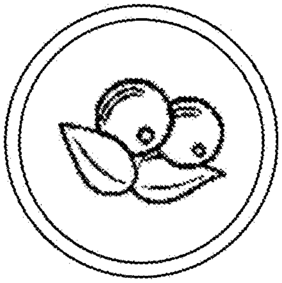
Figure 16:
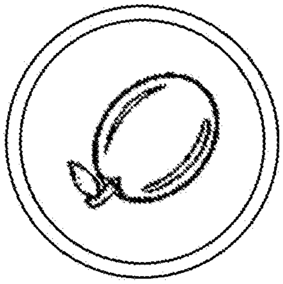

FIG. 16 is a table illustrating variation in acceleration in the case where rotation is performed in the same rotation direction as in FIG. 15 with the pattern turned upside down. In this case, the rotation is performed in the order of "watermelon"→"7"→"cherry"→"plum"→"watermelon" in an upside-down state. At this time, the combination of accelerations (ax, ay, az) varies as follows: (0, 0, 1)→(0, 1, 0)→(0, 0, −1)→(0, −1, 0)→(0, 0, 1). Accordingly, since variation in acceleration differs between FIG. 15 and FIG. 16, a difference in rotation direction can be detected.

Figure 17:
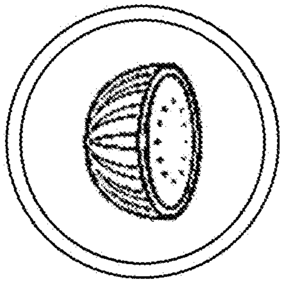
FIG. 17 is a table illustrating variation in acceleration in the case where rotation is performed in the same rotation direction as in FIG. 15 with the pattern rotated by 90°.
Figure 17:
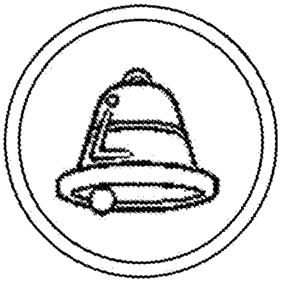
Figure 17:
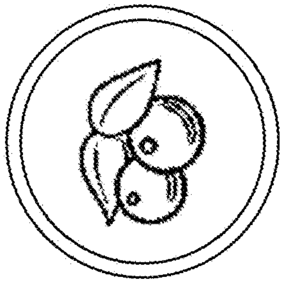
Figure 17:
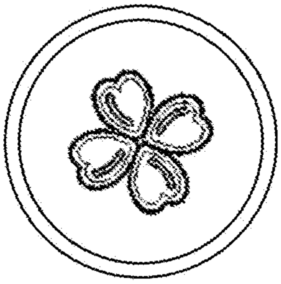

FIG. 17 is a table illustrating variation in acceleration in the case where rotation is performed in the same rotation direction as in FIG. 15 with the pattern rotated by 90°. In this case, the rotation is performed in the order of "watermelon"→"bell"→"cherry"→"clover"→"watermelon". At this time, the combination of accelerations (ax, ay, az) varies as follows: (1, 0, 0)→(0, 1, 0)→(−1, 0, 0)→(0, −1, 0)→(1, 0, 0). Accordingly, since variation in acceleration differs between FIG. 15 and FIG. 17, a difference in rotation direction can be detected.

Figure 18:
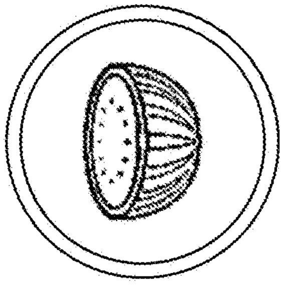
FIG. 18 is a table illustrating variation in acceleration in the case where rotation is performed in the same rotation direction as in FIG. 15 with the pattern rotated by 90° in a direction opposite to that in FIG. 17.
Figure 18:
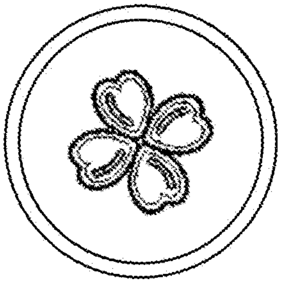
Figure 18:
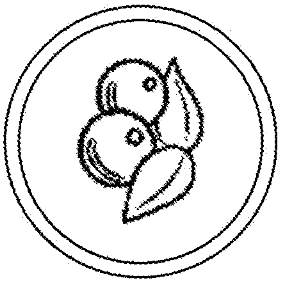
Figure 18:
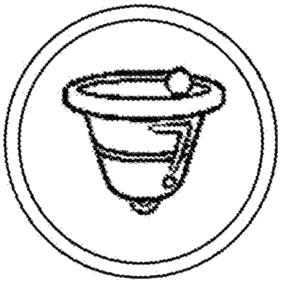

Furthermore, FIG. 18 is a table illustrating variation in acceleration in the case where rotation is performed in the same rotation direction as in FIG. 15 with the pattern rotated by 90° in a direction opposite to that in FIG. 17. The rotation is performed in the order of "watermelon"→"clover"→"cherry"→"bell"→"watermelon". At this time, the combination of accelerations (ax, ay, az) varies as follows: (−1, 0, 0)→(0, 1, 0)→(1, 0, 0)→(0, −1, 0)→(−1, 0, 0). Accordingly, since variation in acceleration differs between FIG. 15 and FIG. 18, a difference in rotation direction can be detected.

This processing is not only processing for aligning the orientation of the pattern, but also processing for detecting the rotation direction of the sphere reel 20.

(Determination of Stop Pattern)

In S27, the stop control part 52 determines whether the rotation can be stopped at the input stop pattern. In order to stop at the input stop pattern, it is necessary that the rotation direction (orientation of the pattern) and the acceleration at the time of stop of the sphere reel 20 satisfy a predetermined condition.

In the case of "watermelon", when the acceleration varies as follows: (0, 0, −1)→(0, 1, 0)→(0, 0, 1)→(0, −1, 0)→(0, 0, −1), the rotation needs to be stopped at (ax, ay, az)=(0, 0, −1).

In the case of "plum", when the acceleration varies as follows: (0, 0, −1)→(0, 1, 0)→(0, 0, 1)→(0, −1, 0)→(0, 0, −1), the rotation needs to be stopped at (ax, ay, az)=(0, 1, 0).

In the case of "cherry", when the acceleration varies as follows: (0, 0, −1)→(0, 1, 0)→(0, 0, 1)→(0, −1, 0)→(0, 0, −1), the rotation needs to be stopped at (ax, ay, az)=(0, 0, 1).

In the case of "7", when the acceleration varies as follows: (0, 0, −1)→(0, 1, 0)→(0, 0, 1)→(0, −1, 0)→(0, 0, −1), the rotation needs to be stopped at (ax, ay, az)=(0, −1, 0).

In the case of "bell", when the acceleration varies as follows: (1, 0, 0)→(0, 1, 0)→(−1, 0, 0)→(0, −1, 0)→(1, 0, 0), the rotation needs to be stopped at (ax, ay, az)=(0, 1, 0).

In the case of "clover", when the acceleration varies as follows: (1, 0, 0)→(0, 1, 0)→(−1, 0, 0)→(0, −1, 0)→(1, 0, 0), the rotation needs to be stopped at (ax, ay, az)=(0, −1, 0).

(Prohibition of Lateral Rotation Only)

As described above, it is necessary to determine the rotation direction in order to determine the stop pattern. That is, longitudinal rotation by the first drive 31 is always required, and lateral rotation by the second drive 32 must not be included. For example, if the acceleration is (0, −1, 0), the pattern can take "7", "bell", "plum", and "clover", which includes cases where the pattern is not in a correct orientation. That is, in the case of only lateral rotation by the second drive 32, the pattern and the orientation thereof cannot be uniquely specified.

By longitudinal rotation of the sphere reel 20 by the first drive 31, the variation in acceleration is patternized. Hence, it becomes possible to determine whether the rotation is being performed in a correct rotation pattern. Even when an acceleration pattern at this time is not within the correct rotation pattern, by adding lateral rotation by the second drive 32 during rotation of the first drive 31, the acceleration pattern can be varied into the correct rotation pattern.

§ 4. Action and Effects

Since the sphere reel 20 can be rotated in a complex manner by the sphere driving device 30, the player can be attracted. Since the posture of the sphere reel 20 can be detected by the detection part 23 and the stop posture can be controlled by the stop control part 52, the pattern at the time of stop can be controlled.

In the sphere reel 20, since power is supplied in a non-contact power supply manner, and the detection part 23 and the output part 24 operate, there is no cable or the like that hinders rotation. Hence, complex rotation that attracts a player can be realized.

In the sphere driving device 30, since rotation is performed during frictional contact by the rollers of the first drive 31 and the second drive 32 that have different rotation center axes, rotation with two degrees of freedom can be realized. Hence, complex rotation that attracts a player can be realized.

Since the second drive 32 can be prevented from contact with the sphere reel 20 by the retreat portion, the sphere reel 20 can be rotated by the first drive 31 without unnecessary friction. Abrasion of a roller surface or the surface of the sphere reel 20 due to friction can be prevented.

Embodiment 2

Another embodiment of the disclosure will be described below. For convenience of description, members having the same functions as those described in the above embodiment will be denoted by the same reference numerals, and description thereof will not be repeated.

(Stopping while Maintaining Oblique Rotation)

In Embodiment 1, since rotation is performed randomly in S21, it is possible to attract the player by oblique rotation. However, immediately before stopping (S24 to S27), rotation is adjusted to a predetermined rotation pattern and then stopped. Hence, the rotation may become monotonous immediately before stopping. Accordingly, in Embodiment 2, a method for stopping while maintaining oblique rotation is described.

(Control of Reel Coordinate System)

A reel coordinate system is defined in the sphere reel 20 according to an acceleration value detected by the detection part 23. The reel coordinate system can be represented by a unit vector whose position is fixed and whose posture varies with respect to a coordinate system of the game machine 1.

Figure 19:
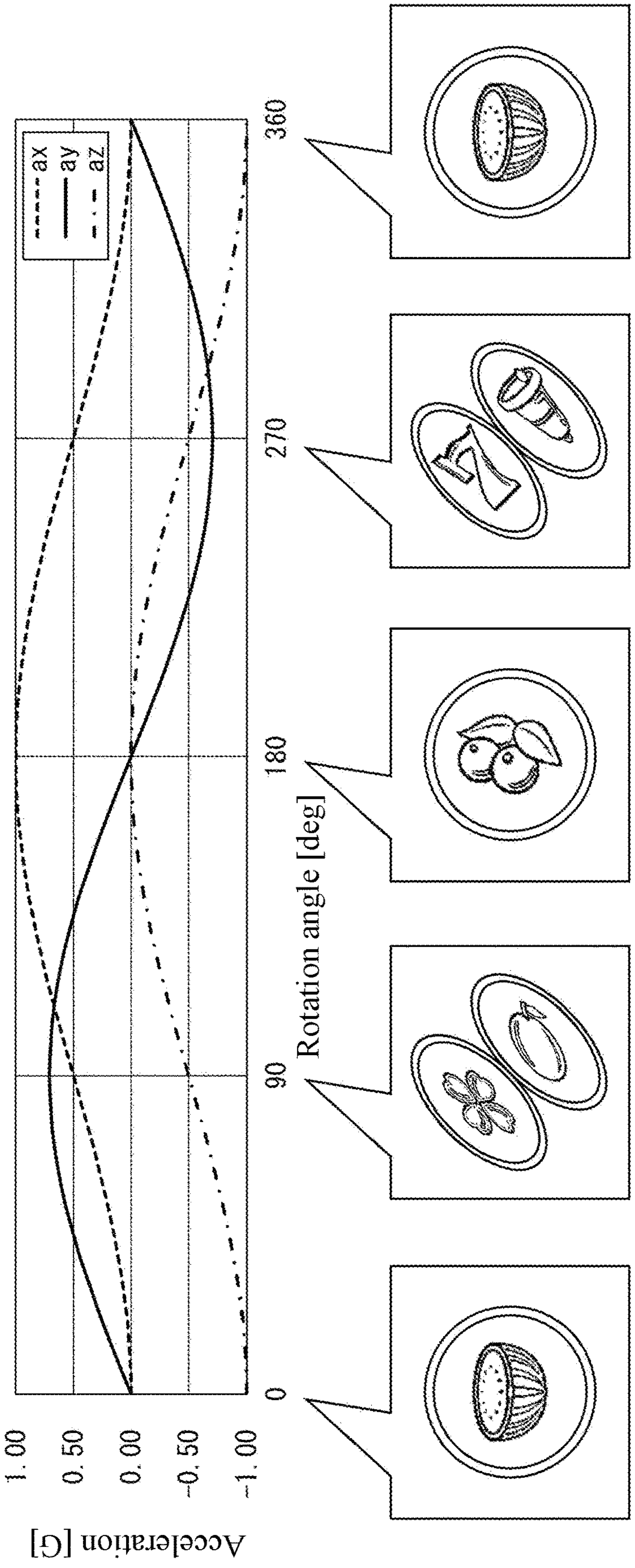
FIG. 19 illustrates variations in pattern and acceleration during oblique rotation.

FIG. 19 illustrates variations in pattern and acceleration during oblique rotation. In FIG. 19, $(1/\sqrt{2}, 0, -1/\sqrt{2})$ is adopted as a vector of the rotation center axis.

Since the posture can be uniquely determined by continuous variation in acceleration, in the present embodiment, a one-to-one correspondence can be established by mapping a pattern between the acceleration and the posture using a table.

As a result, by performing feedback control to drive the first drive 31 and the second drive 32 so that an acceleration vector becomes a target value, it is possible to control the posture even in oblique rotation, that is, to control the stop pattern.

In the example of FIG. 19, the sphere reel 20 is rotated under the conditions that the rotation center axis is constant. However, the unit vector may be controlled to vary so as to draw a random trajectory, and may be controlled to become the unit vector of the stop pattern (stop posture) immediately before stopping. In this case, since relatively complex and dynamic rotation can be realized, the player can be further attracted.

[Modifications]

(Circular Roller and Retreat Mechanism)

In Embodiments 1 and 2, it is described to use the different diameter roller 34 in the second drive 32. However, the disclosure is not limited thereto. That is, the roller of the second drive 32 may also be a circular roller of a circular shape with a constant radius. In this case, since the sphere reel 20 and the roller are always in frictional contact, it becomes easy to control the sphere reel 20.

At this time, the second drive 32 may include a retreat mechanism that separates the roller in the second drive 32 from the sphere reel 20 when the contact between the roller and the sphere reel 20 needs to be broken. Examples of the retreat mechanism include a motor and a solenoid.

(Differential Mechanism)

In Embodiments 1 and 2, in the sphere driving device 30, the first drive 31 is in charge of longitudinal rotation and the second drive 32 is in charge of lateral rotation, thereby rotating the sphere reel 20. However, the disclosure is not limited thereto.

Figure 20:
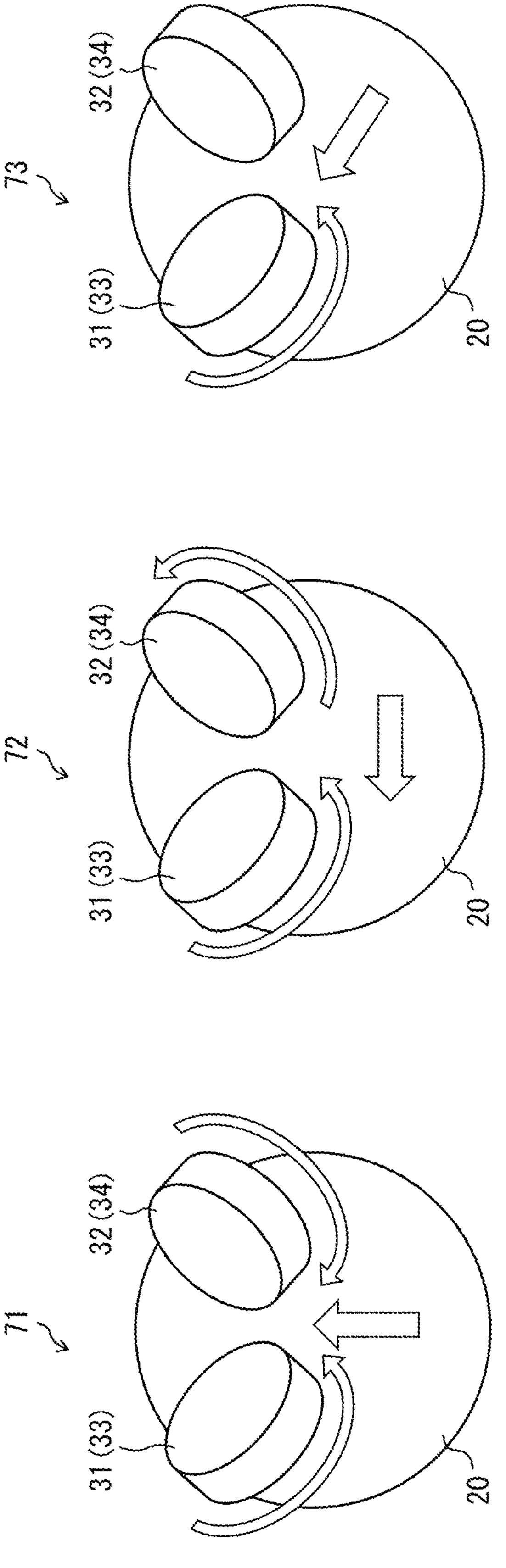
FIG. 20 illustrates an example in which a differential mechanism is adopted as one example of a mechanism of the sphere driving device.

FIG. 20 illustrates an example in which a differential mechanism is adopted as one example of a mechanism of the sphere driving device 30. By adopting the differential mechanism in the sphere driving device 30, the first drive 31 and the second drive 32 include rollers rotating in different planes angled with respect to a vertical direction and a horizontal direction. The rollers may be different diameter rollers or circular rollers. That is, the first drive 31 rotates about the first axis, and the second drive 32 rotates about the second axis different from the first axis.

Since the differential mechanism is adopted, longitudinal rotation (denoted by reference numerical 71 in FIG. 20) is realized by rotating the first drive 31 and the second drive 32 in the same direction. Lateral rotation (denoted by reference numerical 72 in FIG. 20) is realized by rotating the first drive 31 and the second drive 32 in opposite directions. Oblique rotation (denoted by reference numerical 73 in FIG. 20) is realized by rotating only one of the first drive 31 and the second drive 32 and stopping the other.

By controlling the rollers of the first drive 31 and the second drive 32 at different speeds, a rotation angle of the sphere reel 20 can be arbitrarily changed (the rotation center axis can be changed).

(Three Drive Parts)

In Embodiments 1 and 2, the sphere driving device 30 includes the first drive 31 and the second drive 32. However, the disclosure is not limited thereto.

Figure 21:
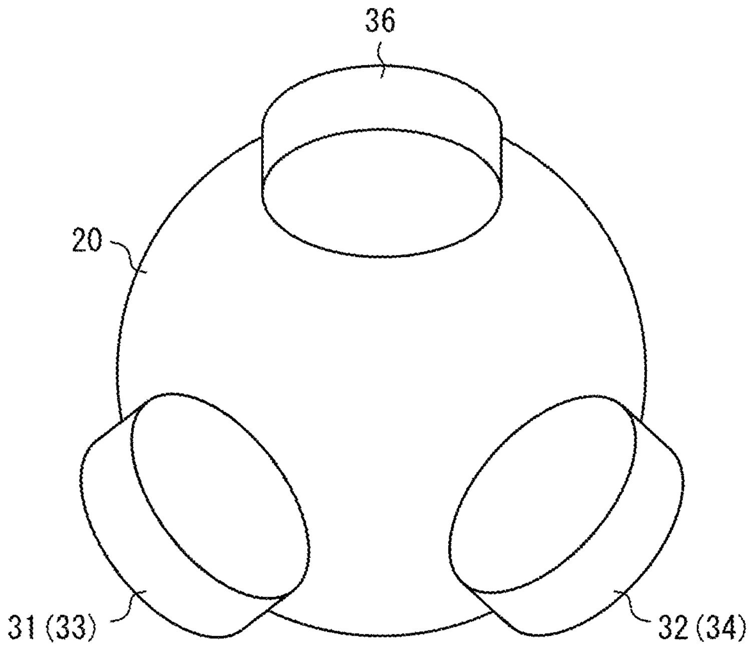
FIG. 21 illustrates another example of the mechanism of the sphere driving device.

FIG. 21 illustrates another example of the mechanism of the sphere driving device 30. The sphere driving device 30 may further include a third drive 36 in addition to the first drive 31 and the second drive 32. The first drive 31, the second drive 32, and the third drive 36 may be arranged spaced 120° from each other with respect to the sphere reel 20.

In this case, since the degree of freedom is increased from two degrees of freedom to three degrees of freedom, a motion becomes possible in which the same pattern can be rotated while being presented to the player. Hence, the degree of freedom of motion of the sphere reel 20 is improved, and the player can be attracted.

(Electric Spectaculars)

In Embodiments 1 and 2, description has been given only of rotation of the sphere reel 20. However, other methods may be used to attract the player. For example, a light emitting diode (LED) may be arranged in advance at the position of each pattern of the sphere reel 20, and lighting of the LED may be controlled in accordance with rotation of the sphere reel 20.

ADDITIONAL NOTES

The disclosure is not limited to the embodiments described above, and may be modified in various ways within the scope of the claims. An embodiment derived from a proper combination of technical means disclosed in respective different embodiments is also encompassed in the technical scope of the disclosure.

What is claimed is:

1. A pattern variably displaying device comprising:
a plurality of sphere reels, in which a plurality of patterns are described on a surface of a sphere;
a sphere driving device, rotating each of the sphere reels; and
a control part, controlling the sphere driving device, wherein the control part comprises a power transmitter,
wherein the sphere reels each comprise:
a detection part, detecting a posture of the sphere reels, wherein the detection part comprises a sensor;
an output part, outputting the posture to the control part, wherein the output part comprises a coil; and
a power supply, supplying power to the detection part and the output part,
wherein the control part
acquires a stop pattern which is a pattern at a time when the sphere reels stop rotating,
determines a rotation direction of the sphere reels from a history of the posture,
drives the sphere driving device so that the rotation direction corresponds to the stop pattern, and
drives the sphere driving device to stop rotation of the sphere reels at the stop pattern.

2. The pattern variably displaying device according to claim 1, further comprising:
a power transmitter using a coil, wherein
the power supply is a power receiver using a coil.

3. The pattern variably displaying device according to claim 1, wherein
the output part uses communication in a wireless tag.

4. The pattern variably displaying device according to claim 1, wherein
the power supply is a battery.

5. The pattern variably displaying device according to claim 1, wherein
the sphere driving device comprises:
a first drive, bringing a first roller into contact with the sphere reels and rotating the sphere reels about a first axis; and
a second drive, bringing a second roller into contact with the sphere reels and rotating the sphere reels about a second axis different from the first axis.

6. The pattern variably displaying device according to claim 5, wherein
the first roller has a constant radius along a circumferential direction; and
the second roller comprises a large diameter portion with a large roller diameter and a small diameter portion with a small roller diameter along the circumferential direction.

7. The pattern variably displaying device according to claim 5, wherein
the second drive comprises a retreat portion that prevents the second roller from contacting the sphere reels.

8. The pattern variably displaying device according to claim 7, wherein
the second drive further comprises a separation detection part that detects that the second roller is not in contact with the sphere reels, wherein the separation detection part comprises a sensor.

9. A game machine comprising:
a pattern variably displaying device, variably displaying a plurality of patterns; and
a game machine processor, determining display content of the pattern variably displaying device, wherein
the pattern variably displaying device comprises:
a plurality of sphere reels, in which a plurality of patterns are described on a surface of a sphere;

a sphere driving device, driving each of the sphere reels; and a control part, controlling the sphere driving device, wherein the control part comprises a power transmitter, wherein the sphere reels each comprise:

a detection part, detecting a posture of the sphere reels, wherein the detection part comprises a sensor;

an output part, outputting the posture to the control part, wherein the output part comprises a coil; and a power supply, supplying power to the detection part and the output part, wherein the control part acquires a stop pattern which is a pattern at a time when the sphere reels stop rotating, determines a rotation direction of the sphere reels from a history of the posture, drives the sphere driving device so that the rotation direction corresponds to the stop pattern, and drives the sphere driving device to stop rotation of the sphere reels at the stop pattern.

10. A pattern variably displaying method comprising:

acquiring a stop pattern of a plurality of sphere reels having a plurality of patterns described on a surface of a sphere, the stop pattern being a pattern at a time when the sphere reels stop rotating;

determining a rotation direction of the sphere reels from a history of a posture of the sphere reels;

driving a sphere driving device that rotates the sphere reels so that the rotation direction corresponds to the stop pattern; and driving the sphere driving device to stop rotation of the sphere reels at the stop pattern.

* * * * *